D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 1.

WITNESSES:
R. Hamilton
E. B. House.

INVENTOR.
Daniel Sexton
BY
Warren D. House
His ATTORNEY.

D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 2.

WITNESSES:
RE Hamilton
E.B. House.

INVENTOR.
Daniel Sexton
BY Warren D. House
His ATTORNEY.

D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 3.

WITNESSES:

INVENTOR.
Daniel Sexton
BY Warren D. House
His ATTORNEY.

THE COLUMBIA PLANOGRAPH CO., WASHINGTON, D. C.

D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 4.

D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 5.

WITNESSES:
R. Hamilton
E. B. House

INVENTOR.
Daniel Sexton
BY
Warren D. House
His ATTORNEY.

D. SEXTON.
MACHINE FOR FORMING RECESSES IN INSOLES.
APPLICATION FILED NOV. 6, 1913.

1,174,186.

Patented Mar. 7, 1916.
6 SHEETS—SHEET 6.

WITNESSES:
R. E. Hamilton
E. B. Haus

INVENTOR.
Daniel Sexton
BY Warren D. House
His ATTORNEY.

THE COLUMBIA PLANOGRAPH CO., WASHINGTON, D. C.

UNITED STATES PATENT OFFICE.

DANIEL SEXTON, OF KANSAS CITY, MISSOURI.

MACHINE FOR FORMING RECESSES IN INSOLES.

1,174,186.  Specification of Letters Patent.  Patented Mar. 7, 1916.

Application filed November 6, 1913. Serial No. 799,464.

*To all whom it may concern:*

Be it known that I, DANIEL SEXTON, a citizen of the United States, residing in Kansas City, in the county of Jackson and State of Missouri, have invented certain new and useful Improvements in Machines for Forming Recesses in Insoles, of which the following is a specification.

My invention relates to improvements in machines for forming recesses in insoles.

The object of my invention is to provide a machine by which recesses may be cut in one side of an inner sole, whereby depressions may be formed to receive salient portions on the foot of a person wearing a shoe containing the inner sole, as described in the patent granted to me November 15, 1910, No. 975,576.

The novel features of my invention are hereinafter fully described and claimed.

In the accompanying drawings which illustrate the preferred embodiment of my invention.

Similar reference characters designate similar parts in the different views.

Figure 2:
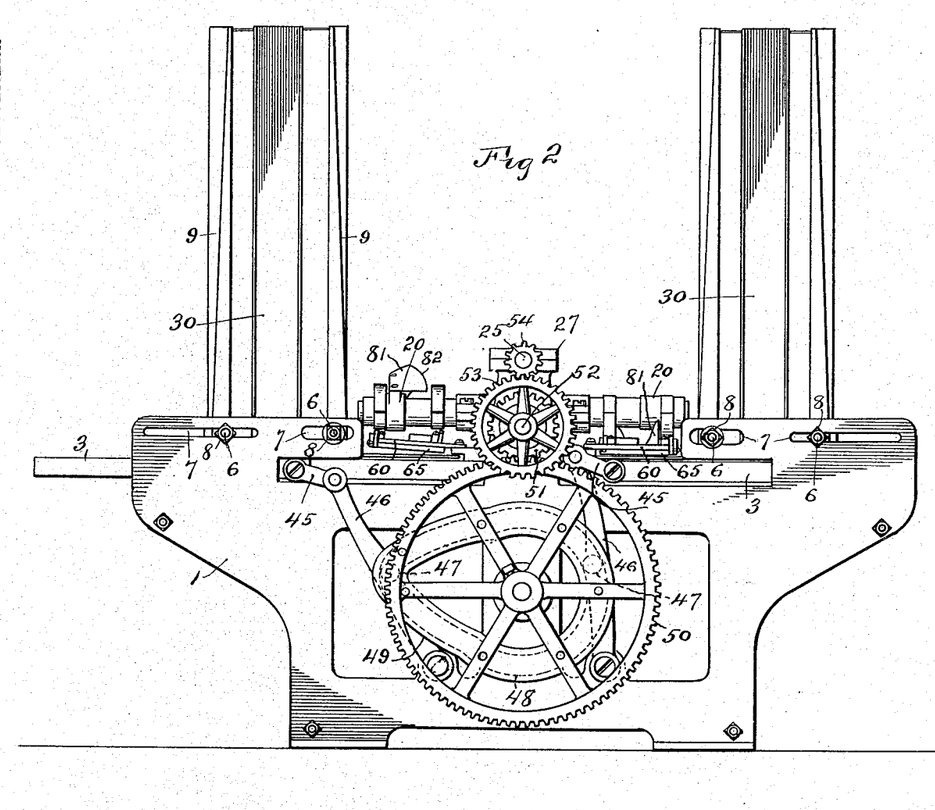
Fig. 2 is an elevation of the machine.
Figure 3:
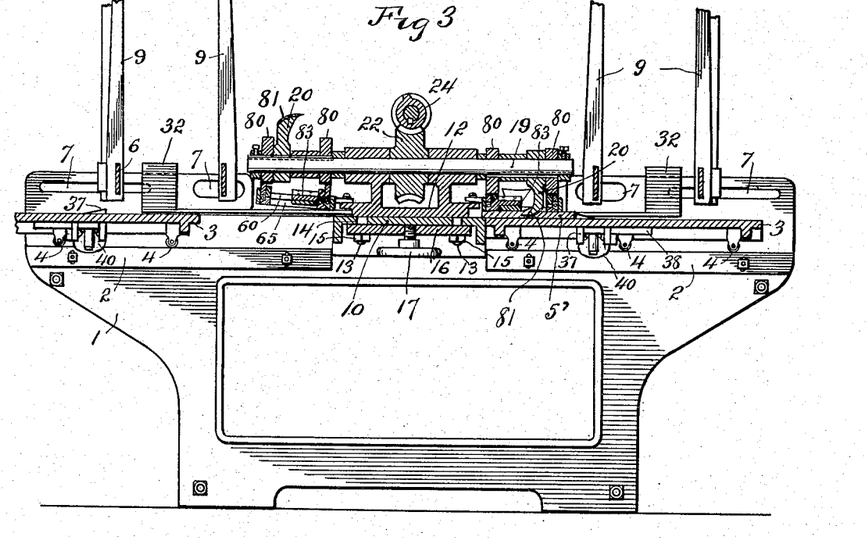
Fig. 3 is a vertical sectional view on the line $a$—$b$ of Fig. 1, the insoles being removed from the holders, one insole being shown in position for cutting.

1 designates a frame of any suitable material, size and form provided with horizontal guides 2 on which are reciprocatively mounted two supports comprising preferably two horizontal plates 3 each provided with carrying wheels 4 adapted to run on the guides 2. The supports 3 are respectively provided with flat horizontal surfaces adapted to respectively support two piles of insoles 5 contained within two holders respectively. Each holder comprises preferably two horizontal bars 6 having screw-threaded ends slidably mounted in horizontal slots 7 provided in opposite vertical sides of the frame 1 as is shown in Figs. 2 and 3. The bars 6 have nuts 8 mounted thereon and adapted to bear against the frame 1. Secured to each bar 6 are two vertical guide bars 9, adapted to be disposed against the pile of inner soles contained within the holder. The bars 9 may be adjusted toward and from the insoles to correspond with the width of said insoles.

Mounted on a horizontal plate 10 which forms a part of the frame 1 are two supplemental frames 11 and 12, the frame 11 being rigidly secured to the plate 10 and the frame 12 being horizontally slidable to and from the frame 11. The frame 12 is provided with vertical bolts 13 which extend downwardly through two transverse slots 14 provided in the plate 10, Fig. 3. The bolts 13 at their lower ends support nuts 15, which in turn support a clamping plate 16 provided with a vertical screw threaded hole in which is mounted a hand screw 17, Fig. 3, which is adapted to bear against the under side of the plate 10, for the purpose of securing the supplemental frame in the position to which it may be adjusted.

Figures 6, 7, 8:
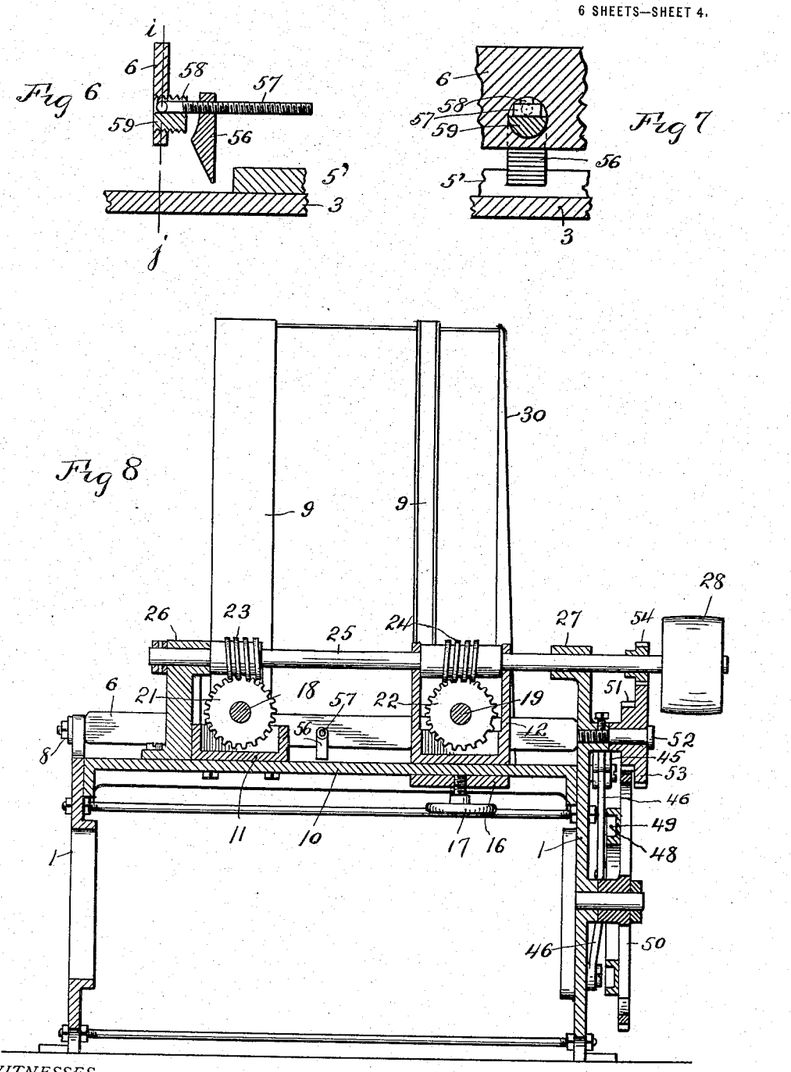
Fig. 6 is an enlarged vertical sectional view on the line $g$—$h$ of Fig. 1.
Fig. 7 is a vertical sectional view on the line $i$—$j$ of Fig. 6.
Fig. 8 is a vertical sectional view on the line $k$—$l$ of Fig. 1.

Rotatably mounted in the supplemental frames 11 and 12 respectively are two horizontal shafts 18 and 19, each of which has secured to it adjacent to opposite ends thereof two rotary cutters 20, the particular construction of which will be hereinafter described. For rotating the shafts 18 and 19 said shafts have respectively secured to them, as shown in Fig. 8, two worm wheels 21 and 22 which mesh respectively with two worms 23 and 24 which are secured to a horizontal shaft 25 rotatably mounted in a bearing 26, which is supported by plate 10, and a bearing 27 secured to the frame 1. A pulley 28 is secured to the shaft 25 for driving the same. The worm 24 is longitudinally slidable on the shaft 25 with the supplemental frame 12 through which said shaft extends.

Figure 1:
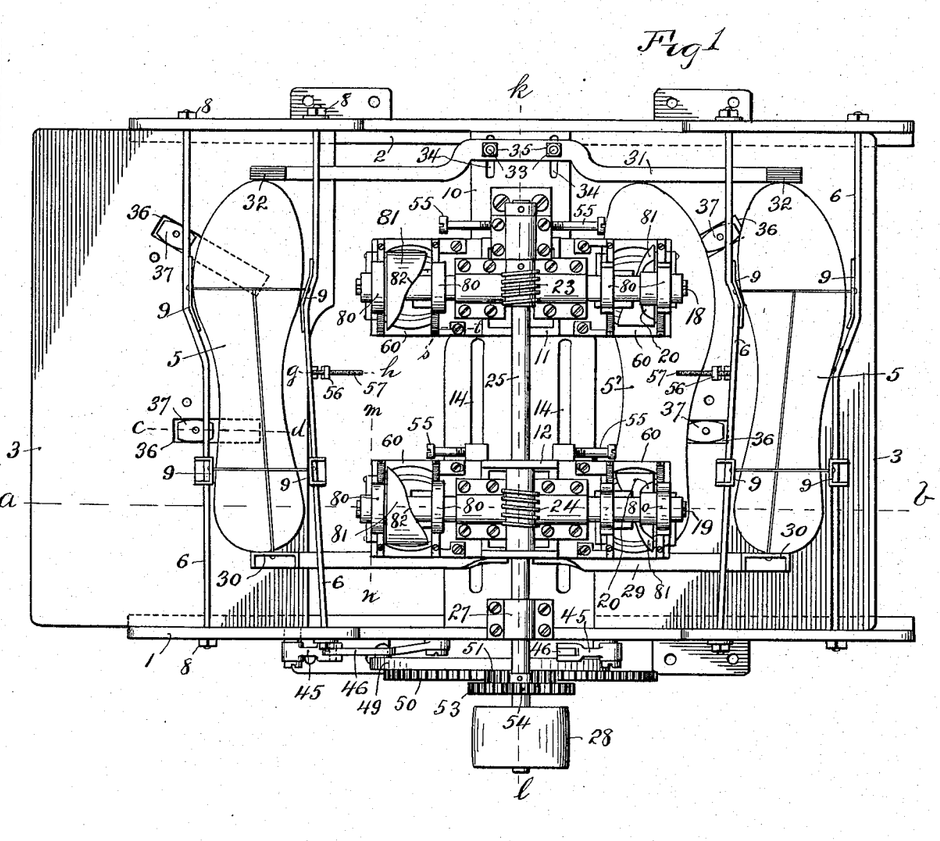
Figure 1 is a plan view of the machine, showing insoles in the holders, and one insole disposed in the position adapted for having recesses cut therein.

Secured to the supplemental frame 12 is a horizontal bar 29, Fig. 1, which has secured to it adjacent to its respective ends two vertical guide bars 30 which serve as guides for the heel ends of the piles 5, each bar being located between a pair of the bars 6. The bars 30 and the bar 29 are adjustable with the supplemental frame 12 to correspond with the length of the insoles 5.

As shown in Fig. 1 a transverse horizontal guide bar 31 is adjustable on the plate 10 toward and from the bar 29 and is provided at its ends with two upstanding projections 32 disposed respectively between the two pairs of bars 6, and are adapted to serve as guides for the toe ends of the piles 5. Bolts 33 extend through the bar 31 and through longitudinal slots 34 provided in the plate 10. The bolts 33 have mounted on their upper ends nuts 35 which are adapted to bear against the upper side of the bar 1 for retaining it in position.

Figures 4, 5:
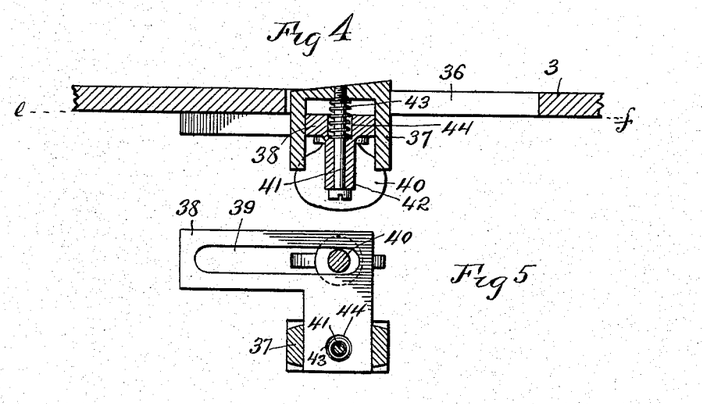
Fig. 4 is an enlarged vertical sectional view on the line $c$—$d$ of Fig. 1.
Fig. 5 is a horizontal sectional view on the line $e$—$f$ of Fig. 4.

As shown in Fig. 1 and in Fig. 4 each plate 3 is provided with slots 36 in which are respectively mounted two U-shaped stops 37, the downwardly extending arms of which slidably embrace one set of arms of two right-angled horizontal plates 38 each of which is provided with a slot 39 through which extends a clamping thumb screw 40 the upper end of which has screw-threaded engagement with the plate 3. By loosening the said thumb screw the plate 38 may be moved so as to adjust the stop 37 on the slot 36. To normally retain each stop 37 in the elevated position shown in Fig. 4, in which position it is adapted to strike the outer edge of the lowest adjacent insole, each stop is provided with a vertical screw 41, Fig. 4, which is slidably mounted in a downwardly extending tubular projection 42 on the under side of the plate 38. A coil spring 43, mounted in a recess 44 in the plate 38 and encircling the screw 41 exerts a tension which normally holds the stop 37 in the elevated position. As shown in Fig. 4 the upper end of each stop 37 is inclined downwardly and outwardly, which permits the stop to pass under the pile 5 when the plate 3 which carries it moves from the inner position shown at the right in Fig. 1 to the outer position shown at the left in said figure.

When the plates 3 are moved from an outer position to the inner position the stops 37 will engage the outer edges of the lowest insoles in the two piles and will carry the insoles thus detached to positions under the cutters 20. In Fig. 1 I have shown the right plate or support 3 in the inner position with one of the insoles 5' detached from the pile and positioned under the two right rotary cutters 20. The supports or plates 3 are disposed at a height such that the cutters 20 in rotating will pass through the material in the upper side of the insoles when said insoles are in the cutting position, as shown in Fig. 3. The cutters 20 on each of the shafts 18 and 19 are disposed in diametrically opposite positions, so that when one cutter is operating on an insole the other cutter will be raised so as to permit an insole passing thereunder. For alternately reciprocating the two plates 3 these plates have respectively secured pivotally to them two links 45 which are respectively pivoted to two levers 46, Figs. 1 and 2, on which are respectively mounted two rollers 47 located in a continuous groove 48, Fig. 2, provided in a cam 49 which is secured to the inner side of a spur gear wheel 50, Figs. 2 and 8, which meshes with a spur gear wheel 51 secured on a stud 52 which in turn is secured horizontally in the frame 1. Attached to the spur gear wheel 51 is a spur gear wheel 53 which meshes with a spur gear wheel 54 secured on the shaft 25. The shape of the groove 48 in the cam 49 is such that the levers 46 will alternately force the plates 3 from the outer to the inner position, and during one-half of a revolution of said cam will hold said plates in the inner position during the cutting operation of the cutters 20. The worm wheels 21 and the gear wheels 50, 51, 53 and 54 are of such relative sizes and have such number of teeth that during each revolution of a cutter 20 the adjacent plate 3 will make one complete reciprocation.

When the shaft 25 is rotated the plates 3 will alternately be moved from the outer position to the inner position and will carry inwardly, each, an inner sole to a position in which said inner sole will have its inner edge strike against two outwardly extending horizontal screws 55, Fig. 1, mounted respectively on the supplemental frames 11 and 12. The screws 55 may be adjusted inwardly and outwardly to suit the widths of the insoles which are being operated upon. After the cutters 20 have cut two recesses in the inner sole which has thus been fed inwardly, and the cutter has become detached from said inner sole, the plate carrying said insole will move outwardly, and the stops 37 carried by said plate 3 will pass under the adjacent pile 5 and will engage with the outer edge of the bottom insole in the adjacent pile, said pile having dropped by gravity the thickness of the insole which had just been previously detached from said pile. As the plate 3 moves outwardly the insole 5' which has been cut will drop from the plate from which it has been scraped by the outward movement of the said plate by means of a stop 56, Figs. 1 and 6, which is provided with a screw threaded hole in which is fitted a horizontal screw threaded rod 57 having a T-headed outer end pivotally mounted in a longitudinal T-shaped groove 58 provided in a screw 59 fitted in a transverse screw threaded hole provided in the adjacent plate 6. The rod 57 is pivoted so as to permit an insole when being detached from the pile swinging the said rod and the stop plate 56 carried by it, upwardly, so as to permit the inward movement of the said insole.

Figure 10:
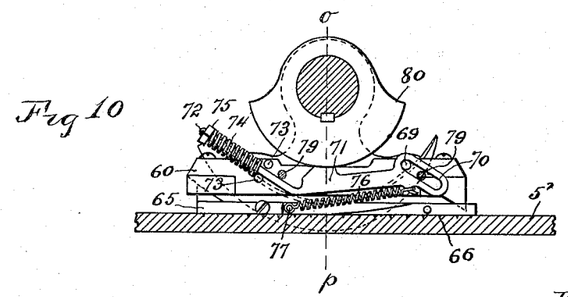
Fig. 10 is a view similar to Fig. 9, but with the knife and cam shown in positions diametrically opposite to the positions shown in Fig. 9.
Figure 11:
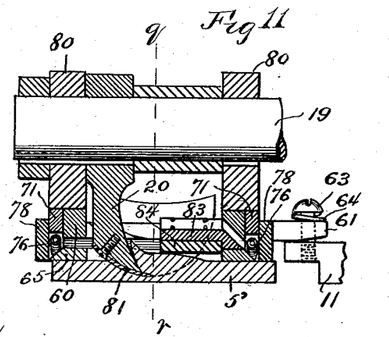
Fig. 11 is a vertical sectional view on the line $o$—$p$ of Fig. 10.
Figure 12:
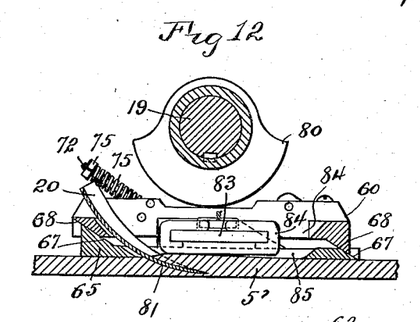
Fig. 12 is a vertical sectional view on the line $q$—$r$ of Fig. 11.
Figure 13:
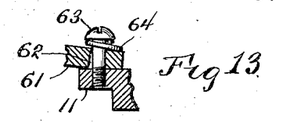
Fig. 13 is an enlarged vertical sectional fragmental view on the line $s$—$t$ of Fig. 1.
Figure 14:
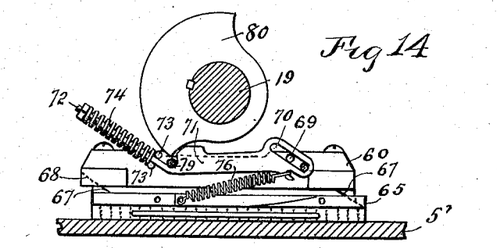
Fig. 14 is a view similar to Fig. 9 with the cam about to engage one of the members which coöperates with one of the clamping members, the rotary cutter being removed.
Figure 15:
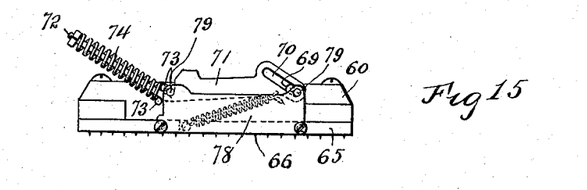
Fig. 15 is an elevation view of one of the clamping members and parts connected therewith.
Figures 16, 17:
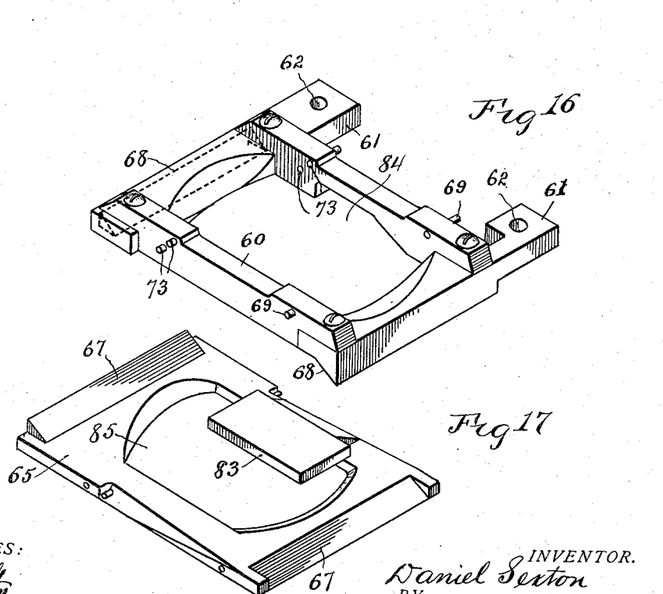
Fig. 16 is a perspective view, enlarged, of one of the members which supports one of the clamping plates.
Fig. 17 is a perspective view of one of the clamping plates enlarged.

For the purpose of clamping the insoles tightly against the supporting plates 3 the following described mechanisms are provided: Four rectangular plates 60, one of which is shown in Fig. 16, are provided each at its inner edge with two inwardly extending projections 61, having each a vertical hole 62. Each end of each of the frames 11 and 12 is provided with two vertical threaded holes in which are fitted respectively two vertical screws 63 which extend through and are loosely fitted in the holes 62 of the adjacent plate 60. Eight coil springs 64, one of which is shown in Fig. 13, respectively encircle the screw 63 and by bearing upon the projections 61 at the inner sides of the screws 63 serve to tilt the plates 60 upwardly at their outer edges. Four clamping plates 65 having their lower sides provided with teeth 66, Fig. 15, for engagement with the upper sides of the insoles, are respectively supported by the plates 60, and are vertically movable, and are also movable parallel with the upper surfaces of the plates 3. The upper side of each of the plates 65 is provided at opposite ends, as is shown in Fig. 17, with beveled surfaces 67 which are adapted to engage similarly beveled surfaces 68, Fig. 12, which are provided on the under side and opposite ends of each of the plates 60. For yieldingly supporting the plates 65 from the plates 60 each of the plates 60 is provided at its opposite edges with two horizontal pins 69, which extend into and are slidably mounted respectively in two inclined slots 70 provided respectively in two plates 71 disposed at opposite edges of the adjacent plate 60. Each plate 71 is provided at the end opposite the slot 70 with an upwardly inclined extension 72 slidably mounted between two horizontal pins 73 which extend horizontally from the adjacent edge of the plate 60, see Fig. 10. Encircling each extension 72 is a coil spring 74 the lower end of which bears against the pins 73 and the upper end of which bears against a nut 75 which is mounted upon the screw threaded outer end of the extension 72. The tension of the spring 74 is such as will cause the adjacent plate 71 to be moved upwardly to the position shown in Fig. 9. A coil spring 76 has its lower end secured to a horizontal pin 77 provided at the edge of the plate 65. The upper end of the coil spring 76 is attached to the adjacent plate 71. It will be understood that two springs 76 are provided respectively at the inner and outer edges of each clamping plate 65, as shown in Fig. 11. The tension of the springs 76 is such that the plates 65 will be drawn upwardly and with the inclined surfaces 67 against the inclined surfaces 68 of the plates 60. At opposite edges of each clamping plate 65 are rigidly secured respectively two plates 78, Figs. 11 and 15 each of which is provided with two horizontal inwardly extending pins 79 mounted respectively in the adjacent slot 70 of the plate 71 and above the adjacent extension 72. The pins 79 by resting upon the plates 71 serve to support the clamping plates 65 in the position shown in Fig. 15. For forcing the plates 65 tightly against the upper sides of the insoles each of the shafts 18 and 19 has secured to it two pairs of cams 80, each pair being adapted to come in contact with the upper side of one of the plates 60, and to also come in contact with the upper edges of the adjacent plates 71, for the purpose of forcing said plates to the clamping positions shown in Figs. 10, 11 and 12. The relative arrangement of the plates 60, 65 and 71 and of the cams 80 and rotary cutters 20, is such that when the cutters 20 are passing through the material of the insoles 5', as shown in Figs. 10, 11 and 12, the cams 80 will be in the positions shown in Figs. 10 and 12, in which positions the plates 65 will be engaged with the adjacent insoles 5' and the plates 60 and 71 will be depressed. Each cutter 20 has a peripheral cutting blade 81, a cross section of which in a plane parallel with the axis, has a curved periphery, as shown in Fig. 11, and which is of circular form in a plane which is perpendicular to the axis of rotation of the cutter 20, as shown in Figs. 9 and 12.

Figure 9:
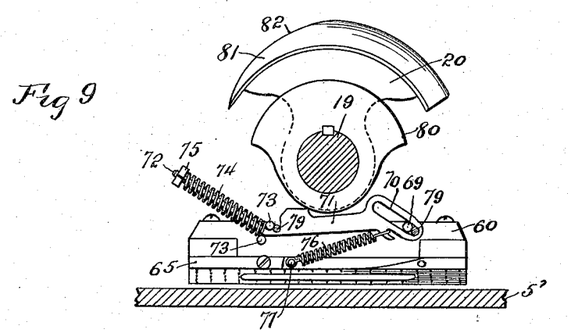
Fig. 9 is an enlarged vertical sectional view on the line $m$—$n$ of Fig. 1.

As shown in Figs. 1 and 9 the cutting edge 82 of each of the blades 81 is disposed obliquely to the path of movement of said blade and to the axis of the cutter 20 carrying said blade. By means of this form of the blade it will, in passing through the insole, cut a curved recess in the upper side thereof, and the cutting edge of the blade will be drawn lengthwise through the material instead of being forced at right-angles thereto, thereby making the blade cut more easily and smoothly. To hold the portion which is cut out by the blade 81 in position until the blade has passed entirely free from the material of the insole, each plate 65 is provided with a horizontal abutment 83, see Figs. 11, 12 and 17 which is disposed above the path of movement of the blade 81 and which is preferably provided with a leather covering 84 against the under side of which the cut-out portion of the insole is adapted to bear during the cutting operation. The abutment 83 and its covering 84 thus prevent the blade 81 from tearing the cut-out portion from the body of the insole and holds said cut-out portion firmly in position until the cutting operation has been performed. It will be understood that each of the plates 60 is provided with a vertical hole 84 therethrough to permit the revolution of the cutter 20. In like manner and for like purpose each of the plates 65 is provided with a vertical hole 85 therethrough. To equalize the end thrust on the shaft 25 the worms 23 are provided respectively with right and left threads, whereby the shafts 18 and 19 are rotated in opposite directions, and for this reason the cutters 20 on corresponding ends of the shafts 18 and 19 have their blades oppositely disposed and said cutters are arranged to have their blades simultaneously effect the cutting operation.

As has already been described when the shaft 25 is driven by the pulley 28 the cutters 20 will be rotated and the plates 3 will be alternately reciprocated by means of a mechanism which has already been described. As each of the plates 3 moves inwardly it will detach from the adjacent pile 5 and carry with it the lowest insole of said pile and, when the plate is in the innermost position, shown at the right in Fig. 1, the detached insole 5' will be disposed under the two adjacent clamping plates 65 and with its inner edge disposed against the adjacent adjustable stop screws 55, and the cutters 20, cams 80 and plates 60, 65 and 71 will be in the positions shown in Fig. 9, said plates being raised to permit the passage under the plates 65 of the detached insole 5'. Continued revolution of the shafts 18 and 19 will bring the cams 80 carried thereby against the upper sides of the adjacent plates 60, and against the upper edges of the adjacent plates 71 depressing said plates and thereby permitting the clamping plates 65 carried thereby to lower against the upper side of the detached insole 5'. When the cams 80 have been moved to the position shown in Figs. 10, 11 and 12 the springs 76 will have drawn the plates 65 horizontally with the inclined surfaces 67 thereof against the inclined surfaces 68 of the plates 60 and in a direction corresponding to the path of movement of the cutting blades 81 through the material of the insole.

The cutting blades 81 in passing through the material of the insole will have a tendency to carry with them the insole which being engaged with the teeth 66 of the plates 65 will force said plates more tightly against the inclined surfaces 68, the inclination of which will cause the clamping plates 65 to move downwardly, at the same time as they move forwardly, thereby causing said clamping plates to more tightly clamp the insole against the support 3 which carries it. The material which is cut by the blades 81 from the insole will be held by the abutments 83 in position until the blades have entirely severed said material from the insole. After this has been accomplished, the plate 3, carrying the insole, will be moved outwardly by means of the cam 49 and the mechanism connected therewith and already described, and the insole with the recesses formed therein will have its outer edge brought against the stop 56 which will hold the insole from further outward movement until the support 3 has been withdrawn from the insole upon which the insole will fall by gravity. After the insole has dropped and the plate 3 carrying it has reassumed its outermost position, the opposite plate 3 will have been moved to the innermost position, and will have detached from the other pile the lowermost insole thereof and placed it under the other set of cutters 20. The other sets of clamping devices will then clamp the insole so positioned and the other two cutters will form the two recesses in said insole in the manner already described. After this has been done the left plate 3, as viewed in Fig. 1, will again move outwardly and the right plate 3 will move inwardly thus detaching and positioning another insole, after which the operation hereinbefore described will be repeated.

I do not limit my invention to the structure herein described and illustrated, as modifications, within the scope of the appended claims may be made without departing from the spirit of my invention.

Having thus described my invention, what I claim and desire to secure by Letters Patent, is:—

1. In a machine for forming recesses in insoles, a rotary cutter having a periphery which is convex at opposite sides of a central plane which intersects the axis of rotation at right angles and which is concentric with said axis, and having a knife blade cutting edge disposed sharply oblique to the path of movement of said cutter.

2. In a machine for forming recesses in insoles, a rotary cutter having a periphery curved about two axes at right angles to each other and having a cutting edge disposed obliquely to the path of movement of the periphery of the cutter, and means for holding one side of an insole in the path of movement of said cutting edge and parallel with the axis of said cutter.

3. In a machine for forming recesses in insoles, a rotary cutter having a periphery curved about two axes at right angles to each other and having a cutting edge disposed obliquely to the path of movement of the periphery of the cutter, a support for an insole disposed so as to hold one side of said insole in the path of movement of said cutting edge and parallel with the axis of said cutter, and means for clamping the insole to said support.

4. In a machine for forming recesses in insoles, a rotary cutter, a support for holding an insole with one side in the path of movement of said cutter, whereby the cutter will form a recess in said side, and means assisted by the movement of the cutter through the material of the insole for clamping the insole against said support.

5. In a machine for forming recesses in insoles, a rotary cutter, a support for holding an insole with one side in the path of movement of said cutter, whereby the cutter will form a recess in said side, a clamping member for holding the insole against said support, and yielding means for forcing said clamping member toward said support.

6. In a machine for forming recesses in insoles, a rotary cutter, a support for holding an insole with one side in the path of movement of said cutter, a clamping member for holding the insole against said support, and means assisted by the cutter in its movement through the material of the insole for forcing the clamping member toward said support.

7. In a machine for forming recesses in insoles, a rotary cutter, a support for holding an insole with one side in the path of movement of said cutter, two members, one of which is a clamping member adapted to clamp an insole against said support, one of said members having an inclined surface adapted to engage the other member and force said clamping member toward said support, when said clamping member is moved parallel with said insole in one direction, and means for moving the clamping member in said direction.

8. In a machine for forming recesses in insoles, a rotary cutter, a support for holding an insole with one side in the path of movement of said cutter, and two members, one being adapted to clamp an insole against said support, and one having an inclined surface adapted to engage the other member and force the clamping member toward said support when the clamping member is moved in the direction of the cutter in its passage through the material of the insole.

9. In a machine for forming recesses in insoles, a rotary cutter, a support for holding an insole with one side in the path of movement of said cutter, two members, one being adapted to clamp an insole against said support, and one having an inclined surface adapted to engage the other and force the clamping member toward said support when the clamping member is moved in the direction of the movement of the cutter in its passage through the material of the insole, and means for moving said clamping member in said direction.

10. In a machine for forming recesses in insoles, a rotary cutter, a support for holding an insole with one side in the path of movement of said cutter, two members, one being adapted to clamp an insole against said support, and one having means for forcing the clamping member toward said support when the clamping member is moved in the direction of movement of the cutter in its passage through the material of the insole, and means for moving the clamping member in said direction.

11. In a machine for forming recesses in insoles, a rotary cutter, a support for holding an insole with one side in the path of movement of said cutter, and two members, one being adapted to clamp an insole against said support and the other having means for forcing the clamping member toward said support when the clamping member is moved in the direction of movement of the cutter in its passage through the material of the insole.

12. In a machine for forming recesses in insoles, a rotary cutter, a support for holding an insole with one side in the path of movement of said cutter, whereby the cutter will cut out a portion of the insole and form a recess, clamping means for holding the insole against said support, and an abutment against which the portion which is being cut out is adapted to bear during the cutting operation.

13. In a machine for forming recesses in insoles, a rotary cutter, a support for holding an insole with one side in the path of movement of said cutter, and a clamping member for holding the insole against said support and provided with an abutment against which the portion cut from the insole by the cutter is adapted to bear during the passage of the cutter through the material of the insole.

14. In a machine for forming recesses in insoles, a rotary cutter, a support for holding an insole with one side in the path of movement of said cutter, a clamping member for holding the insole against said support, the clamping member being movable toward and from and parallel with said support, yielding means for forcing said clamping member toward said support and in a direction corresponding to the direction of movement of the cutter through the material of the insole, means for retracting the clamping member, and unyielding means for forcing the clamping member toward said support, when the clamping member is moved in the direction of movement of the cutter in its passage through the material of the insole.

15. In a machine for forming recesses in insoles, a support for holding an insole, a clamping member for holding the insole against said support, an abutment against which a portion cut from the insole is adapted to bear during the cutting operation, and a rotary cutter adapted to pass between said abutment and said support, and in so passing being adapted to cut said portion from one side of said insole.

16. In a machine for forming recesses in insoles, a rotary cutter, a support for holding an insole with one side in the path of movement of said cutter, means for clamping said insole to said support, a shaft carrying said cutter, and a cam for actuating said clamping means and carried by said shaft.

17. In a machine for forming recesses in insoles, a rotary cutter, a support for holding an insole with one side in the path of movement of said cutter, yielding clamping means for holding the insole against said support, a cam for actuating said clamping means, and rotary means carrying said cutter and said cam.

18. In a machine for forming recesses in insoles, a rotary cutter, a support for holding an insole with one side in the path of movement of said cutter, a clamping member for holding the insole against said support and movable toward and from said support and in the direction of movement of the cutter during its passage through the material of the insole, means by which the clamping member is moved toward said support, when it is moved in the direction of movement of the cutter through the insole, a cam revoluble with said cutter, and means actuated by said cam for moving said clamping means in said direction.

19. In a machine for forming recesses in insoles, two rotary cutters, means connecting the cutters for simultaneously rotating said cutters in opposite directions, and a support for holding an insole with one side in the path of movement of said cutters.

20. In a machine for forming recesses in insoles, two rotary cutters, means connecting the cutters for simultaneously rotating said cutters in opposite directions, means for adjusting said cutters toward and from each other, and a support for holding an insole with one side in the path of movement of said cutters.

21. In a machine for forming recesses in insoles, rotary cutters, and means for consecutively feeding a plurality of insoles into positions in which one side of each insole will be in the path of movement of one of said cutters.

22. In a machine for forming recesses in insoles, a rotary cutter, a holder for containing a pile of insoles, and a support movable to and from a position in which it will hold an insole with one side in the path of movement of said cutter, and provided with means for removing said insoles from said holder one at a time and carrying them to said position.

23. In a machine for forming recesses in insoles, a rotary cutter, a holder for containing a pile of insoles, a support reciprocative to and from a position in which it will hold an insole with one side in the path of movement of said cutter, and having means for removing said insoles consecutively and carrying them to said position, and means for rotating said cutter and for reciprocating said support.

In testimony whereof I have signed my name to this specification in presence of two subscribing witnesses.

DANIEL SEXTON.

Witnesses:
WARREN D. HOUSE,
E. B. HOUSE.

Copies of this patent may be obtained for five cents each, by addressing the "Commissioner of Patents, Washington, D. C."